US009883631B2

(12) United States Patent
Bilde

(10) Patent No.: US 9,883,631 B2
(45) Date of Patent: Feb. 6, 2018

(54) CROP PROCESSING APPARATUS IN A COMBINE HARVESTER

(71) Applicant: AGCO A/S, Hesston, KS (US)

(72) Inventor: Morten Leth Bilde, Langaa (DK)

(73) Assignee: AGCO A/S, Randers (DK)

( * ) Notice: Subject to any disclaimer, the term of this patent is extended or adjusted under 35 U.S.C. 154(b) by 410 days.

(21) Appl. No.: 14/442,042

(22) PCT Filed: Nov. 5, 2013

(86) PCT No.: PCT/EP2013/073064
§ 371 (c)(1),
(2) Date: May 11, 2015

(87) PCT Pub. No.: WO2014/082820
PCT Pub. Date: Jun. 5, 2014

(65) Prior Publication Data
US 2017/0318748 A1    Nov. 9, 2017

(30) Foreign Application Priority Data

Nov. 28, 2012 (GB) .................................. 1221345.0

(51) Int. Cl.
*A01F 12/44* (2006.01)
*A01F 12/46* (2006.01)
(Continued)

(52) U.S. Cl.
CPC ............ *A01F 12/444* (2013.01); *A01F 7/067* (2013.01); *A01F 12/446* (2013.01); *A01F 12/46* (2013.01); *A01F 12/56* (2013.01)

(58) Field of Classification Search
CPC ....... A01D 41/12; A01D 61/02; A01F 12/446; A01F 12/46; A01F 12/30; A01F 12/44; A01F 12/444; A01F 12/56; A01F 7/067
(Continued)

(56) References Cited

U.S. PATENT DOCUMENTS 5,403,235 A      4/1995  Baumgarten et al.
5,466,190 A  *  11/1995  Skinner .................. A01F 12/44
                                                       460/101
(Continued)

FOREIGN PATENT DOCUMENTS

EP    2156727 A2    2/2010
FR    1215745 A     4/1960
(Continued)

OTHER PUBLICATIONS

Eurpoean Receiving Office; International Search Report for International Patent Application No. PCT/2013/073064, dated Jan. 31, 2014.
(Continued)

*Primary Examiner* — Robert E Pezzuto

(57) ABSTRACT

A combine harvester comprises a threshing unit arranged to receive and thresh a crop stream. Separating apparatus are located downstream and rearward of the threshing unit and are arranged to receive the threshed crop stream and convey such a rearward direction. The front of a return pan, disposed below the separating apparatus, overlaps the rear of a stratification pan, disposed below the threshing unit. The stratification pan is driven in an oscillating manner to convey a primary grain/chaff stream rearwardly to a rear edge from where the primary grain/chaff stream falls under gravity into a cleaning unit. The return pan is driven in an oscillating manner to convey a secondary grain/chaff stream forwardly to a front edge from where the secondary grain/chaff stream falls under gravity to combine with the primary grain/chaff stream on the stratification pan. The cleaning unit comprises a fan for generating a cleaning airstream which is directed through the falling grain/chaff stream to encourage the lighter material away from the grain. A plurality of crop flow disrupting elements in the form of fins or tines are
(Continued)

secured to the underside of the return pan above the stratification pan to disrupt the grain/chaff stream and enhance stratification thereof.

14 Claims, 3 Drawing Sheets

(51) Int. Cl.
*A01F 12/56* (2006.01)
*A01F 7/06* (2006.01)

(58) Field of Classification Search
USPC ................ 460/1, 94, 101, 114, 119, 100
See application file for complete search history.

(56) References Cited

U.S. PATENT DOCUMENTS

| | | | |
|---|---|---|---|
| 9,629,310 B2* | 4/2017 | Bilde | .............. A01F 12/446 |
| 2006/0287019 A1 | 12/2006 | Weichholdt et al. | |

FOREIGN PATENT DOCUMENTS

| | | |
|---|---|---|
| GB | 1423325 A | 2/1976 |
| GB | 2487196 A | 7/2012 |

OTHER PUBLICATIONS

Intellectual Property Office, International Search Report for UK Patent Application No. GB 1221345.0, dated Feb. 27, 2013.

\* cited by examiner

CROP PROCESSING APPARATUS IN A COMBINE HARVESTER

BACKGROUND OF THE INVENTION

Field of Invention

The invention relates to the processing of a crop stream in a combine harvester and more particularly to the means to convey grain and chaff separated from the straw to a cleaning unit.

Description of Related Art

For many decades, self-propelled combine harvesters have been used by farmers to harvest a wide range of crops including cereals, maize and oil-seed rape. Typically, a combine harvester cuts the crop material, threshes the grain (or seed) therefrom, separates the grain from the straw, and cleans the grain before storing in an on-board tank. Straw and crop residue is ejected from the rear of the machine.

Combines of the conventional threshing type comprise a threshing cylinder which rotates on a transverse axis and serves to thresh a harvested crop stream as the crop is conveyed tangentially under the cylinder. Grain and chaff separated in this process falls under gravity through a concave grate onto an underlying thresher pan which is driven in an oscillating manner to convey the grain and chaff rearwardly to a rear edge from where the grain and chaff falls under gravity into a cleaning unit (often termed 'cleaning shoe'). The remainder of the crop stream from the threshing process is conveyed rearwardly from the threshing cylinder into separating apparatus which may include a plurality of straw walkers or one or more axial rotors. During the separating process further grain and chaff is removed from the straw and falls under gravity through another grate onto an underlying return pan which is also driven in an oscillating manner to convey the grain and chaff forwardly to a front edge from where it falls under gravity into the cleaning unit. The straw by-product from the separating apparatus is ejected from the rear of the combine.

Combines may instead have a purely axial processor wherein the unthreshed crop material is passed into the front end of one or more axial rotors which go on to thresh and separate the crop material.

The cleaning unit of most combines operates according to a well-established process in which grain and chaff cascading down from the thresher and return pans is subjected to an airstream created by a fan. The airstream blows the lighter chaff and dust rearwardly and out of the combine whilst the heavier grain falls onto and through a chaffer and one or more cleaning sieves before being conveyed to the grain tank.

The speed of the airflow is chosen so as to maximise the percentage of chaff, and indeed any material other than grain (MOG), removed from the crop-stream whilst minimising the percentage grain loss from the rear of the machine.

Developments in threshing and separating technology of recent years have not been matched by an increase in capacity of the cleaning unit. The bottleneck presented by the cleaning unit therefore inhibits utilisation of the full potential of modern separating technology.

Co-pending International patent application published as WO-2012/095239 discloses grain cleaning apparatus having a construction which includes an extended return pan which overlaps the thresher pan so that the grain/chaff stream conveyed by the former falls onto the latter. The combined grain/chaff streams are then conveyed rearwardly by the thresher pan (alternatively termed "stratification pan") by a distance which facilitates stratification of the different materials, namely the chaff and grain, before falling into the cleaning unit. Stratification of the grain and chaff allows a reduced cleaning airflow thus minimising grain loss. Furthermore, the reduced entropy of the grain/chaff mix allows the grain to settle more rapidly on the chaffer.

Testing of the construction disclosed by WO-2012/095239 reveals significant improvement in the capacity of the cleaning unit. However, efforts continue to improve the stratification of materials on the stratification pan upstream of the cleaning unit.

OVERVIEW OF THE INVENTION

In accordance with the invention there is provided a combine harvester comprising threshing apparatus arranged to receive and thresh a crop stream, and separating apparatus located downstream and rearward of the threshing apparatus and arranged to receive the threshed crop stream and convey in a rearward direction, both the threshing apparatus and separating apparatus comprising grates for allowing grain and chaff to fall under gravity onto an underlying conveyance arrangement comprising a stratification pan and a return pan, wherein the front of the return pan overlaps the rear of the stratification pan, the stratification pan being driven in an oscillating manner to convey a primary grain/chaff stream rearwardly to a rear edge from where the primary grain/chaff stream falls under gravity into a cleaning unit, the return pan being driven in an oscillating manner to convey a secondary grain/chaff stream forwardly to a front edge from where the secondary grain/chaff stream falls under gravity to combine with the primary grain/chaff stream on the stratification pan, the cleaning unit comprising a fan for generating a cleaning airstream which is directed through the falling grain/chaff stream, and wherein a plurality of crop flow disrupting elements are secured to the underside of the return pan above the stratification pan to disrupt the grain/chaff stream and enhance stratification thereof.

Advantageously, by providing crop flow disrupting elements on the underside of the return pan conveyance of the top material layer on the stratification pan is partially stalled, thereby enhancing the stratification of grain from the top layer to the bottom layer. As a result, the overall stratification process is improved and the capacity of the cleaning unit is increased. Furthermore, being mounted to the underside of the return pan, the disrupting elements exhibit an oscillating movement which increases the disrupting effect.

The term "stratification pan" will be used hereinafter interchangeably with "thresher pan", both of which relate to an oscillating pan arranged below the threshing apparatus and configured to convey collected crop material in a rearward direction. The term "return pan" will be used hereinafter interchangeably with "separator pan", both of which relate to an oscillating pan arranged below the separating apparatus and configured to convey collected crop material in a forward direction. It should be appreciated, however, that the threshing apparatus and separating apparatus may, in some embodiment, be included in an axial-flow processor having one or more axial rotors.

Preferably, the plurality of crop flow disrupting elements are arranged in a row across the width of the return pan. However, it will be appreciated that other arrangements of disrupting elements can be adopted whilst remaining in the scope of the present invention. For example, two staggered rows of elements could be arranged across the return pan.

The plurality of crop flow disrupting elements preferably comprises at least one downwardly extending fin, and more preferably several downwardly extending fins. The fins may be of a simple construction thus making implementation of the invention by modification of the existing harvesters relatively cheap and simple. By way of example only, the fins may be welded, riveted, brazed or bolted to the underside of the return pan.

Each fin is preferably asymmetric when viewed from the side, pointing downwardly and forwardly. Such a construction provides a scooping effect when combined with the oscillating motion of the return pan. This scooping motion enhances the stalling effect of the top material layer and further improves stratification of the overall crop stream.

Alternative forms of crop flow disrupting elements include fingers or tines or any other downwardly extending protrusions mounted to the return pan.

In a preferred arrangement said plurality of crop flow disrupting elements extend downwardly to leave, when operating, a minimum clearance from the thresher pan of between one-quarter and one-half of the distance between the thresher pan and the underside of the return pan. In another alternative construction, a minimum clearance from the thresher pan of the between 1 cm and 3 cm is provided by the crop flow disrupting elements. It should be appreciated that the chosen clearance between the crop flow disrupting elements and the thresher pan is a trade-off between stalling the top material layer to improve stratification and avoiding blockage of the total crop stream passing over the thresher pan.

The invention lends itself well to combines having either conventional, hybrid or axial processing systems.

BRIEF DESCRIPTION OF THE DRAWINGS

Further advantages of the invention will become apparent from reading the following description of a specific embodiment with reference to the appended drawings in which.

DETAILED DESCRIPTION OF THE INVENTION

Figure 1:
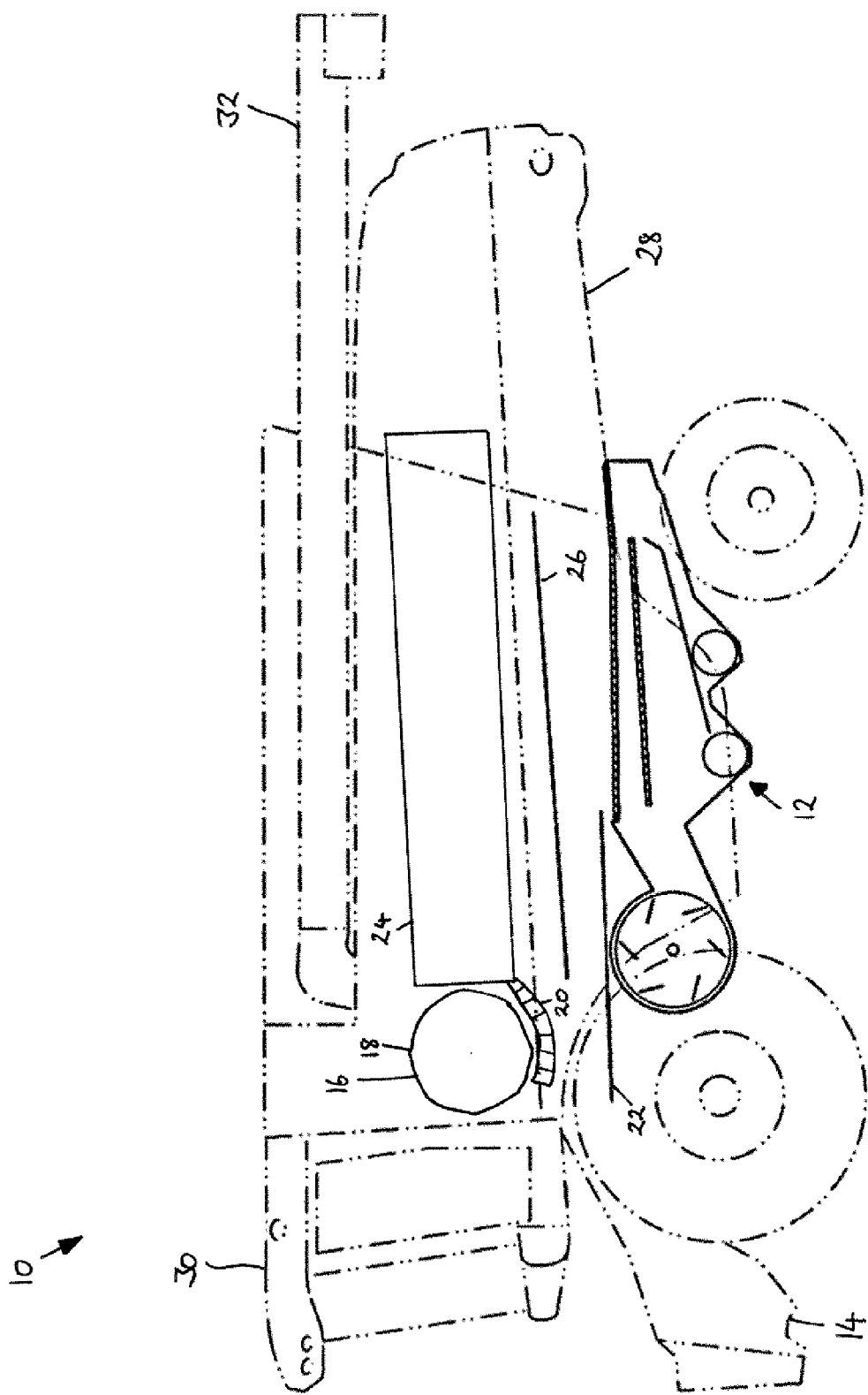
FIG. 1 is side elevation view of a combine harvester embodying one example construction of grain cleaning apparatus according to the invention and showing the outline of the combine harvester in ghost form.

With reference to FIG. 1 a combine harvester 10 is shown in ghost form whilst the grain cleaning apparatus 12 embodied therein is shown with solid lines. Combine 10 includes a front elevator housing 14 at the front of the machine for attachment of a header (not shown). The header when attached serves to cut and collect the crop material as it progresses across the field, the collected crop stream being conveyed up through the elevator housing 14 into a transverse threshing unit which is represented schematically at 16. The transverse threshing unit 16 includes a rotating cylinder 18 and a concave-shaped grate 20. The cylinder 18 includes rasp bars (not shown) which act upon the crop stream to thresh the grain or seeds from the remaining material, the majority of the threshed grain passing through the underlying grate 20 and onto a stratification pan 22.

The remainder of the crop material including straw, tailings and unthreshed grain are passed from the threshing unit 16 into separating apparatus represented at 24. The separating apparatus 24 may include a plurality of parallel, longitudinally-aligned, straw walkers (straw-walker combine). Alternatively, the separating apparatus 24 may include one or two longitudinally-aligned rotors which rotate on an longitudinal axis and convey the crop stream rearwardly in a ribbon passing along a spiral path (axial or hybrid combine). In both cases the separating apparatus serve to separate further grain from the crop stream which passes through a grate-like structure onto an underlying return pan 26. The residue crop material, predominantly made up of straw, exits the machine at the rear 28. Although not shown in FIG. 1, a straw spreader and/or chopper may be provided to process the straw material as required.

For completeness, the combine 10 includes a driver's cab 30 and an unloading auger 32, shown in the transport position in FIG. 1.

The threshing and separating apparatus do not remove all MOG from the grain and the crop stream collected by the stratification pan 22 and return pan 26 typically includes a proportion of straw, chaff, tailings and other unwanted material such as weed seeds, bugs, and tree twigs. A grain cleaning unit is provided to remove this unwanted material thus leaving a clean sample of grain to be delivered to the tank.

For clarity, the term 'grain cleaning apparatus' used hereinafter is intended to include the stratification pan, the return pan and the cleaning unit comprising the fan unit, chaffer and sieve(s).

Figure 2:
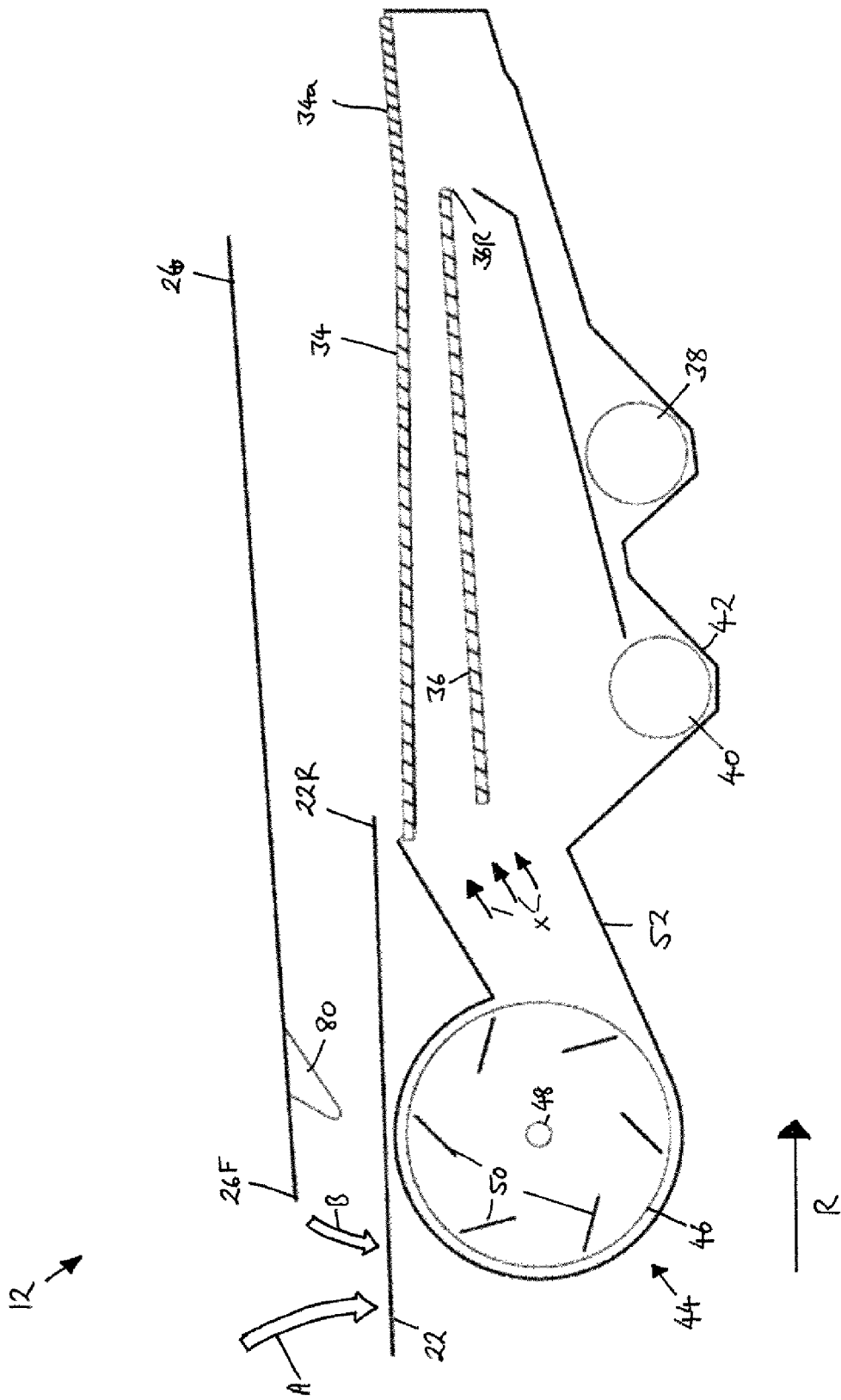
FIG. 2 is a vertical section view through the grain cleaning apparatus of FIG. 1.
Figure 3:
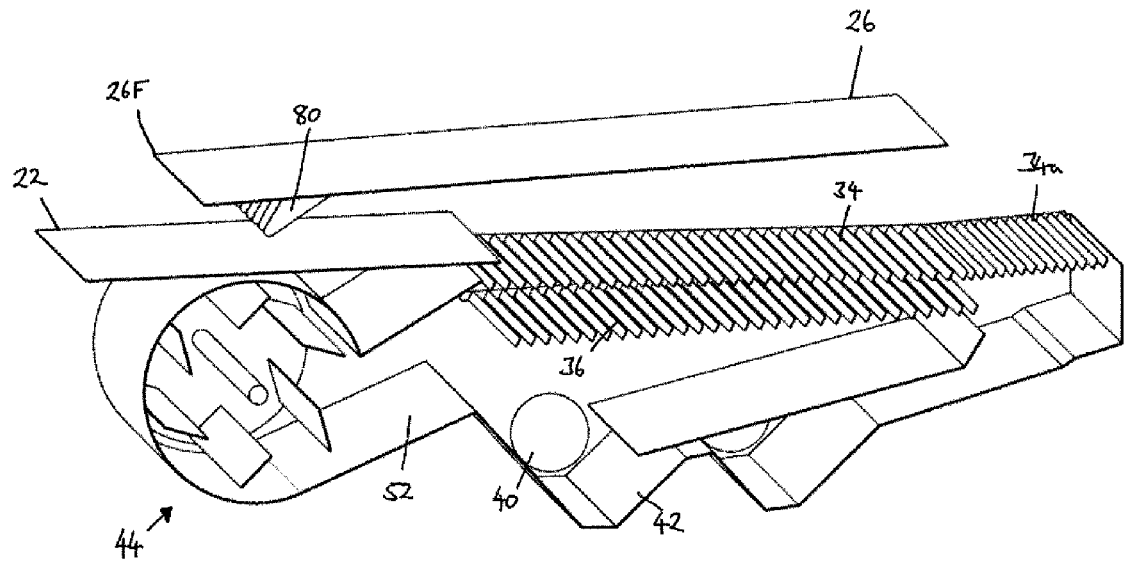
FIG. 3 is a raised front perspective view of the grain cleaning apparatus of FIG. 1.
Figure 4:
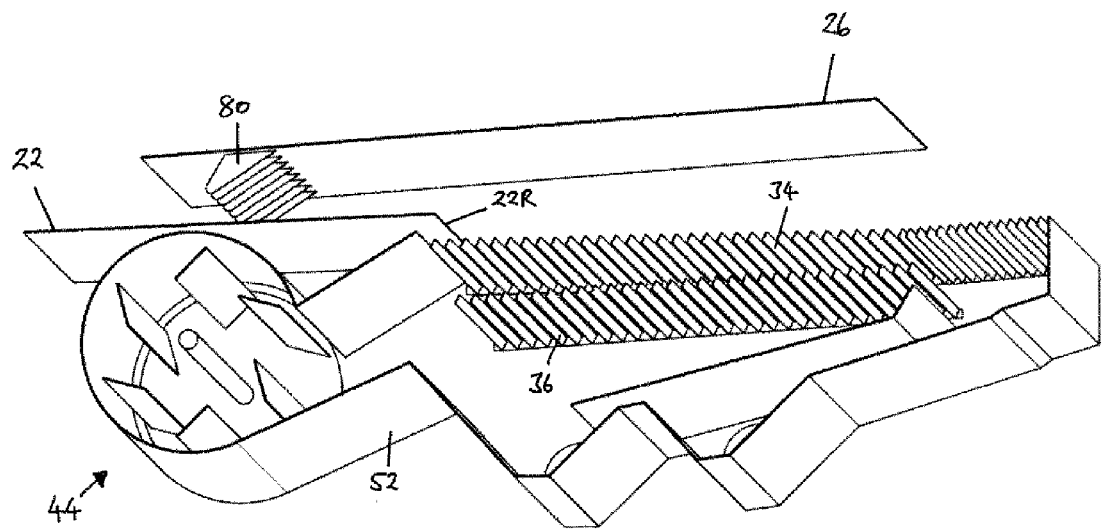
FIG. 4 is a lowered rear perspective view of the grain cleaning apparatus of FIG. 1.

Turning to the detail of the grain cleaning apparatus 12, shown in FIGS. 2, 3 and 4, the stratification pan 22 and return pan 26 are driven in an oscillating manner as in known machines to convey the grain and MOG accordingly. Although the drive and mounting mechanisms for the stratification pan 22 and return pan 26 are not shown, it should be appreciated that this aspect is well known in the art of combine harvesters and is not critical to disclosure of the invention. Furthermore, it should be appreciated that the two pans 22, 26 may take a ridged construction as is know in the art and also appreciate that FIGS. 2-4 show the grain cleaning apparatus 12 in simplistic form.

As mentioned above, grain passing through concave grate 20 falls onto the front of stratification pan 22 indicated by arrow A in FIG. 2. This material is conveyed rearwardly (in the direction of arrow R in FIG. 2) by the oscillating motion of the stratification pan and the ridged construction thereof. Material passing through the grate of separator apparatus 24 falls onto the return pan 26 and is conveyed forwardly by the oscillating motion and ridged construction thereof. When the material reaches the front edge 26F of return pan 26 it falls onto the stratification pan 22 and on top of the material conveyed from the threshing unit 16 and as indicated by arrow B. This conveyance and combination of two crop streams upstream of the cleaning unit is disclosed in WO-2012/095239 to which reference is invited.

The oscillating motion of stratification pan 22 conveys the combined crop streams rearwardly towards the rear edge 22R of stratification pan 22. Whilst conveyed across the stratification pan 22 the crop stream, including grain and MOG, undergoes stratification wherein the heavier grain sinks to the bottom layers adjacent stratification pan 22 and the lighter/larger MOG rises to the top layers.

Upon reaching the rear edge 22R, the crop stream falls onto a chaffer 34 which is also driven in a fore-and-aft oscillating motion. The chaffer 34 is of a known construction and includes a series of transverse ribs or louvers which create open channels or gaps therebetween. The chaffer ribs are angled upwardly and rearwardly so as to encourage MOG rearwardly whilst allowing the heavier grain to pass through the chaffer onto an underlying sieve 36.

Chaffer 34 includes an inclined rear extension section 34a. MOG which reaches the rear section 34a either passes over the rear edge and out of the machine or through the associated grate before being conveyed to a returns auger 38 for rethreshing in a known manner. It should be appreciated that the majority of materials passing through the extension section 34a is, and is intended to be, unthreshed tailings. The construction of the ribs/louvers are the same for both parts of the chaffer 34, 34a but the two sections can be adjusted individually with respect to the clearance between the louvers. In many conditions one will adjust the chaffer extension 34a to have a bigger clearance than the chaffer 34 to catch more of the grains bouncing along the chaffer.

Grain passing through chaffer 34 is incident on sieve 36 which is also driven in an oscillating manner and serves to remove tailings from the stream of grain before being conveyed to on-board tank (not shown) by grain collecting auger 40 which resides in a transverse trough 42 at the bottom of the cleaning unit 12. Tailings 'blocked' by sieve 36 are conveyed rearwardly by the oscillating motion thereof to a rear edge 36R from where the tailings are directed to the returns auger 38 for reprocessing in a known manner.

The grain cleaning apparatus 12 further comprises a fan unit 44 for generating a cleaning air stream which is directed through the falling grain/chaff stream as it falls from edge 22R, and through the sieve 36 and chaffer 34. The fan unit 44 includes a fan 46 which rotates on a transverse axis 48 in a known manner. The fan 46 includes a plurality of impellor blades which draw in air from the transverse ends open to the environment and generate an air stream directed through channel 52 in a generally rearward direction. The air stream (designated generally by arrows X) creates a pressure differential across the chaffer 34 and sieve 36 to encourage lighter MOG rearwardly and upwardly whilst allowing the grain to pass through the chaffer 34 and the sieve 36. Although not shown in FIG. 2, it should be appreciated that the air stream X also passes above chaffer 34 and below stratification pan 22 thus acting upon the crop stream as it falls from the rear edge 22R of the stratification pan 22.

The present invention concerns the stratification of the crop stream as it is conveyed by stratification pan 22. In this regard, a plurality of crop flow disrupting elements in the form of fins 80 are provided and secured to the underside of the return pan 26 above the stratification pan 22. In the example shown in the figures, eight fins 80 are provided although it should be understood that more or less fins can be employed as necessary.

Each fin 80 is secured to the underside of stratification pan 26 by any suitable means which can stand the vigorous oscillating motion of the latter. For example, the fins 80 may be secured by means of welding or bolting.

Arranged in a single row across the width of the return pan 26, the fins 80 serve to engage with the crop stream laying on stratification pan 22. In particular, the fins serve to disrupt the rearward progression of the top layer of the crop stream which predominately consists of MOG, thereby allowing the heavier grain (less affected by the fins 80) to settle to the bottom layers adjacent the stratification pan 22.

The enhanced stratification provided by the fins 80 increases the efficiency at which the airflow X propels the chaff rearwardly as it falls from the rear edge 22R of the stratification pan 22. With less chaff mixed in with the grain, the latter can settle sooner along the length of the chaffer 34. In other words, the grain is protected in the lower material layer and the chaff can be blown out without affecting the grain. The improved efficiency of chaff removal enables a lower fan speed to be selected. thus improving capacity of the cleaning unit and thus reducing grain loss from the rear of the machine.

The fins 80 are of asymmetric shape and are angled forwardly and downwardly to produce, in conjunction with the oscillating motion of the return pan, a scooping effect which further stalls the MOG in the top layer of the crop stream.

In an alternative embodiment (not illustrated) the fins 80 may be replaced by fingers or tines to disrupt the crop flow accordingly. Alternatively further still a hybrid of fins and tines could be employed whilst remaining in the scope of the invention.

In summary there is provided a combine harvester comprising a threshing unit arranged to receive and thresh a crop stream. Separating apparatus are located downstream and rearward of the threshing unit and are arranged to receive the threshed crop stream and convey such a rearward direction. The front of a return pan, disposed below the separating apparatus, overlaps the rear of a stratification pan, disposed below the threshing unit. The stratification pan is driven in an oscillating manner to convey a primary grain/chaff stream rearwardly to a rear edge from where the primary grain/chaff stream falls under gravity into a cleaning unit. The return pan is driven in an oscillating manner to convey a secondary grain/chaff stream forwardly to a front edge from where the secondary grain/chaff stream falls under gravity to combine with the primary grain/chaff stream on the stratification pan. The cleaning unit comprises a fan for generating a cleaning airstream which is directed through the falling grain/chaff stream to encourage the lighter material away from the grain. A plurality of crop flow disrupting elements in the form of fins or tines are secured to the underside of the return pan above the stratification pan to disrupt the grain/chaff stream and enhance stratification thereof.

The invention claimed is:

1. A combine harvester comprising threshing apparatus arranged to receive and thresh a crop stream, and separating apparatus located downstream and rearward of the threshing apparatus and arranged to receive the threshed crop stream and convey in a rearward direction, both the threshing apparatus and separating apparatus comprising grates for allowing grain and chaff to fall under gravity onto an underlying conveyance arrangement comprising a stratification pan and a return pan, wherein the front of the return pan overlaps the rear of the stratification pan, the stratification pan being driven in an oscillating manner to convey a primary grain/chaff stream rearwardly to a rear edge from where the primary grain/chaff stream falls under gravity into a cleaning unit, the return pan being driven in an oscillating manner to convey a secondary grain/chaff stream forwardly to a front edge from where the secondary grain/chaff stream falls under gravity to combine with the primary grain/chaff stream on the stratification pan, the cleaning unit comprising a fan for generating a cleaning airstream which is directed through the falling grain/chaff stream, and wherein a plurality of downwardly extending crop flow disrupting elements are secured to the underside of the return pan above the stratification pan to disrupt the grain/chaff stream and enhance stratification thereof, wherein said plurality of crop flow disrupting element comprises at least one downwardly-extending fin, and wherein each at least one fin is asymmetric when viewed from the side, and points downwardly and forwardly.

2. The combine harvester according to claim 1, wherein said plurality of crop flow disrupting elements are arranged in a row across the width of the return pan.

3. The combine harvester according to claim 1, wherein said plurality of crop flow disrupting elements includes at least one finger or tine.

4. The combine harvester according to claim 1, wherein said plurality of crop disrupting elements leave, when operating, a minimum clearance from the stratification pan of between one quarter and one half of the distance between the stratification pan and the underside of the return pan.

5. The combine harvester according to claim 1, wherein said plurality of crop disrupting elements extend downwardly to leave, when operating, a minimum clearance from the stratification pan of between 1 cm and 3 cm.

6. The combine harvester according to claim 1, comprising a pair of axial-flow rotors which provide, at a front region, the threshing apparatus and, at a rear region, the separating apparatus.

7. The combine harvester according to claim 1, wherein the threshing apparatus comprises a tangential-flow threshing cylinder mounted for rotation on a transverse axis.

8. The combine harvester according to claim 7, wherein the separating apparatus comprises at least one axial-flow rotor mounted for rotation on a respective longitudinal axis.

9. A combine harvester comprising threshing apparatus arranged to receive and thresh a crop stream, and separating apparatus located downstream and rearward of the threshing apparatus and arranged to receive the threshed crop stream and convey in a rearward direction, both the threshing apparatus and separating apparatus comprising grates for allowing grain and chaff to fall under gravity onto an underlying conveyance arrangement comprising a stratification pan and a return pan, wherein the front of the return pan overlaps the rear of the stratification pan, the stratification pan being driven in an oscillating manner to convey a primary grain/chaff stream rearwardly to a rear edge from where the primary grain/chaff stream falls under gravity into a cleaning unit, the return pan being driven in an oscillating manner to convey a secondary grain/chaff stream forwardly to a front edge from where the secondary grain/chaff stream falls under gravity to combine with the primary grain/chaff stream on the stratification pan, the cleaning unit comprising a fan for generating a cleaning airstream which is directed through the falling grain/chaff stream, and wherein a plurality of downwardly extending crop flow disrupting elements are secured to the underside of the return pan above the stratification pan to disrupt the grain/chaff stream and enhance stratification thereof, wherein said plurality of crop disrupting elements leave, when operating, a minimum clearance from the stratification pan of between one quarter and one half of the distance between the stratification pan and the underside of the return pan.

10. The combine harvester according to claim 9, wherein said plurality of crop flow disrupting elements are arranged in a row across the width of the return pan.

11. The combine harvester according to claim 9, wherein said plurality of crop flow disrupting elements includes at least one finger or tine.

12. A combine harvester comprising threshing apparatus arranged to receive and thresh a crop stream, and separating apparatus located downstream and rearward of the threshing apparatus and arranged to receive the threshed crop stream and convey in a rearward direction, both the threshing apparatus and separating apparatus comprising grates for allowing grain and chaff to fall under gravity onto an underlying conveyance arrangement comprising a stratification pan and a return pan, wherein the front of the return pan overlaps the rear of the stratification pan, the stratification pan being driven in an oscillating manner to convey a primary grain/chaff stream rearwardly to a rear edge from where the primary grain/chaff stream falls under gravity into a cleaning unit, the return pan being driven in an oscillating manner to convey a secondary grain/chaff stream forwardly to a front edge from where the secondary grain/chaff stream falls under gravity to combine with the primary grain/chaff stream on the stratification pan, the cleaning unit comprising a fan for generating a cleaning airstream which is directed through the falling grain/chaff stream, and wherein a plurality of downwardly extending crop flow disrupting elements are secured to the underside of the return pan above the stratification pan to disrupt the grain/chaff stream and enhance stratification thereof, wherein said plurality of crop disrupting elements extend downwardly to leave, when operating, a minimum clearance from the stratification pan of between 1 cm and 3 cm.

13. The combine harvester according to claim 12, wherein said plurality of crop flow disrupting elements are arranged in a row across the width of the return pan.

14. The combine harvester according to claim 12, wherein said plurality of crop flow disrupting elements includes at least one finger or tine.

* * * * *